United States Patent [19]

Guck

[11] Patent Number: 5,864,870

[45] Date of Patent: Jan. 26, 1999

[54] METHOD FOR STORING/RETRIEVING FILES OF VARIOUS FORMATS IN AN OBJECT DATABASE USING A VIRTUAL MULTIMEDIA FILE SYSTEM

[75] Inventor: Randal Lee Guck, Dana Point, Calif.

[73] Assignee: Unisys Corp., Bluebell, Pa.

[21] Appl. No.: 769,199

[22] Filed: Dec. 18, 1996

[51] Int. Cl.⁶ .................................................. G06F 17/00
[52] U.S. Cl. .......................... 707/104; 707/100; 707/101; 707/103
[58] Field of Search .................................. 707/100, 101, 707/104, 103

[56] References Cited

U.S. PATENT DOCUMENTS

| 5,557,785 | 9/1996 | Lacquit et al. | 707/104 |
| 5,557,790 | 9/1996 | Bingham et al. | 707/104 |
| 5,584,006 | 12/1996 | Reber et al. | 395/427 |
| 5,659,742 | 8/1997 | Beattie et al. | 707/104 |
| 5,729,741 | 3/1998 | Liaguno et al. | 707/104 |

*Primary Examiner*—Thomas G. Black
*Assistant Examiner*—Donald Min
*Attorney, Agent, or Firm*—J. Ronald Richebourg; Steven R. Petersen; Mark T. Starr

[57] ABSTRACT

A method is provided in a server for storing and retrieving files of various formats in an object database coupled to a network including a multiplicity of clients also coupled to the network. The server includes a storage device for storing objects of the database. The method begins by determining the type and content of files received by the server from the clients coupled. Each file received by the server is transformed into an object. The transformed objects are stored in a hierarchy in accordance with the type and content thereof. The retrieving part of the process includes transmitting a "get" request to the server; searching a Virtual File class for an object whose name matches the file name; and examining corresponding properties of the matching object for compatibility with the first parameter. If compatible, a next parameter is examined for corresponding properties for compatibility. When all parameters have been examined, the content is enveloped and returned to the client that originated the "get" request.

16 Claims, 10 Drawing Sheets

METHOD FOR STORING/RETRIEVING FILES OF VARIOUS FORMATS IN AN OBJECT DATABASE USING A VIRTUAL MULTIMEDIA FILE SYSTEM

FIELD OF THE INVENTION

The present invention relates to a computer-implemented method for determining the type and content of incoming files, transforming such files into objects, and storing them in an object database for later retrieval, which database is part of a specialized server coupled to a network.

CROSS REFERENCE TO RELATED APPLICATIONS

This application relates to the following applications, assigned to the same assignee hereof, which are incorporated herein by reference.

U.S. Ser. No. 08/768,387, now entitled AUTOMATIC FORMAT CONVERSION SYSTEM AND PUBLISHING METHODOLOGY FOR MULTI-USER NETWORK;

U.S. Ser. No. 08/768,386, now U.S. Pat. No. 5,848,415 entitled SELECTIVE MULTIPLE PROTOCOL TRANSPORT AND DYNAMIC FORMAT CONVERSION IN MULTI-USER NETWORK; and, U.S. Ser. No. 08/769,200, entitled METHOD FOR ABSTRACTING MESSAGES OF VARIOUS PROTOCOLS INTO OBJECTS FOR STORAGE IN A DATABASE, now U.S. Pat. No. 5,794,039.

BACKGROUND OF THE INVENTION

In the rapidly developing area of computer interconnecting technology and the Internet there is a need to provide systems and methodology that enable clients using one type of specialized protocol to communicate with other clients having different protocols. Earlier network technologies and even the majority of present network technologies involve slow and complex software systems and methods in order to enable a client with one type of protocol to communicate with another client having a different type of protocol, or with terminals having other protocols such as that used for FAX machines or still other protocols used for telephones. These software systems and methods often involve long, drawn-out translation procedures which are slow, cumbersome and subject to reliability problems.

It would be desirable to provide a network system where any client, no matter what type of format is being used, could create, originate or author a document and enable this document to be transmitted and received by clients having different types of formats; and, also to have such a document receivable by appliances such as FAX machines or telephones. Heretofore, this has not been done with any great degree of efficiency. That is, an originator or author could not create a text or message in his own personal computer format and send it to multiple receiver users, or multiple receiver appliances without any further complications. Such a system and methodology is now possible with the use of the method of the present invention.

Thus, it is an object of the present invention to provide a method for driving a database that solves the problem of transforming incoming files into objects for storage in the database and organizing the transformed files into a hierarchy of objects in accordance with the type and content of such incoming files for storage in the database.

Another object of the present invention is to use the MIME (Multi-Purpose Internet Mail Extension) standard for a file system by employing such standard as the basis for an object database schema.

Yet another object of the present invention is to provide an object database schema that mimics a file system, thereby creating a virtual file system that employs the full categorization technique used by the MIME standard.

A feature of the present invention is that by using an object database system, the object paradigm can be exploited to create a highly modular and extensible system. Extensions can easily be made after system deployment to track changes in standards (e.g., new MIME types and subtypes). Moreover, additional modules can easily be developed and integrated with the virtual multi-media file system to address new content management requirements.

Another feature of the present invention is that by following the MIME standard, the virtual multi-media file system allows content to be represented in a way that allows easy communication across the Internet. That is, even though the MIME standard is not intended for classifying files, doing so makes it easy for files to be sent/received over message-oriented protocols on the internet. Consequently, using the MIME standard for virtual files makes it easy to send and receive data using message-oriented protocols even though the content is obtained from or stored into files, which can be subsequently accessed via file-oriented protocols.

Still another feature of the present invention resides in the provision of accurate identification of a file's content type (i.e., a virtual file object possesses more and better information about its content than a "real" file); the ability to verify that a file's content conforms to its labeling; i.e., each virtual file class can have a method which verifies that a given file's content is correct according to its MIME type/subtype (if a file's content is incorrect, a list of errors can be returned to the author); and, the ability to intelligently search a file for specific content (e.g., text, image, etc.) regardless of its format (i.e., methods can be defined which allow all files to be searched for text—image files can be searched within their narrative text or in text boxes—audio files can be searched for the "speech equivalent" of the given text —video files can be searched both in the audio track and within subtitles, etc.).

An advantage of the present invention is that by the use of "virtual" files instead of real files (i.e., the operating system files), the user is not bound to the operating systems' inherent limitations. For example, system files cannot be assigned a MIME type and subtype, which is a permanent record of the file. By using database objects as "virtual" files, we can assign them all of the properties of a system file plus whatever extra properties the user wishes them to have.

Another advantage of the present invention is that by using an object database, virtual file objects can be interconnected with bi-directional references based on actual content interdependencies (e.g., sub-documents, linked documents, etc.). These interconnections can be exploited in several ways, including but not limited to:

- the deletion of a file that is referenced by another file can be disallowed;
- a file's dependency graph can be determined and reported on—a file's dependency graph is the file and the set of all files that it uses (or are otherwise required to "render" the file);
- virtual file objects can be interconnected to create version trees, which represent "original" files and various versions of each file, each of which represent updates;
- a virtual file can be extracted along with the set of files on which it is dependent (i.e., the files in its dependency graph)—this allows a file to be easily distributed along with the set of files which are required to render or otherwise use it;

a virtual file can be converted from one file format to another (e.g., RTF to PostScript) or even into non-file oriented formats (e.g., mail messages); and, a virtual file can be made available via a wide range of protocols (FTP, HTTP, mail, news, etc.), allowing the same information to be disseminated in multiple ways without replication or manual conversion.

Yet another advantage of the present invention is that by using a portable (i.e., multi-platform) database system, virtual files can have the same interface regardless of the operating system used. For example, file name length and maximum file size can be consistent despite different conventions and limitations between the operating systems used.

Still another advantage of the present invention is that by the use of an object database management system greater security, integrity and recoverability is accomplished than would normally be received in a "real" file system.

SUMMARY OF THE INVENTION

In accordance with the above and other objects, features and advantages of the invention, there is provided a method in a system server for storing files of various formats in an object database coupled to a network including a multiplicity of clients also coupled to the network. The server includes a CPU and at least one storage device coupled thereto for storing objects of the database. The method comprises the steps of determining the type and content of files received by the system server from the clients coupled to the network; transforming each of the files received by the system server into an object; storing each of the transformed objects into a hierarchy in accordance with the type and content thereof; and, returning a code back to the client that transmitted the file to the server indicating receipt of the file.

The present invention also includes a method for retrieving files of various formats stored in the database in accordance with the MIME standard. This method comprises the steps of connecting one of the clients to the server using a protocol, and transmitting thereto a "get" request and determining if the "get" request includes a file name. If it does, a Virtual File class is searched for an object whose name matches the file name. If a matching object is found, then it is necessary to determine if the "get" request includes a parameter. If it does, corresponding properties of the matching object are examined for compatibility with the parameter. If it is compatible, a next parameter is examined for corresponding properties for compatibility with the next parameter. When all parameters have been examined, the matching object's "get content" function is requested, and the content is enveloped and returned to the client that originated the "get" request.

DETAILED DESCRIPTION

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term format as used herein refers to the specific arrangement of data on a disk drive to meet established requirements for storage and retrieval thereof. The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc. The term schema as used herein refers to the logical description of data in a database, including definitions and relationships of data.

Figure 1:
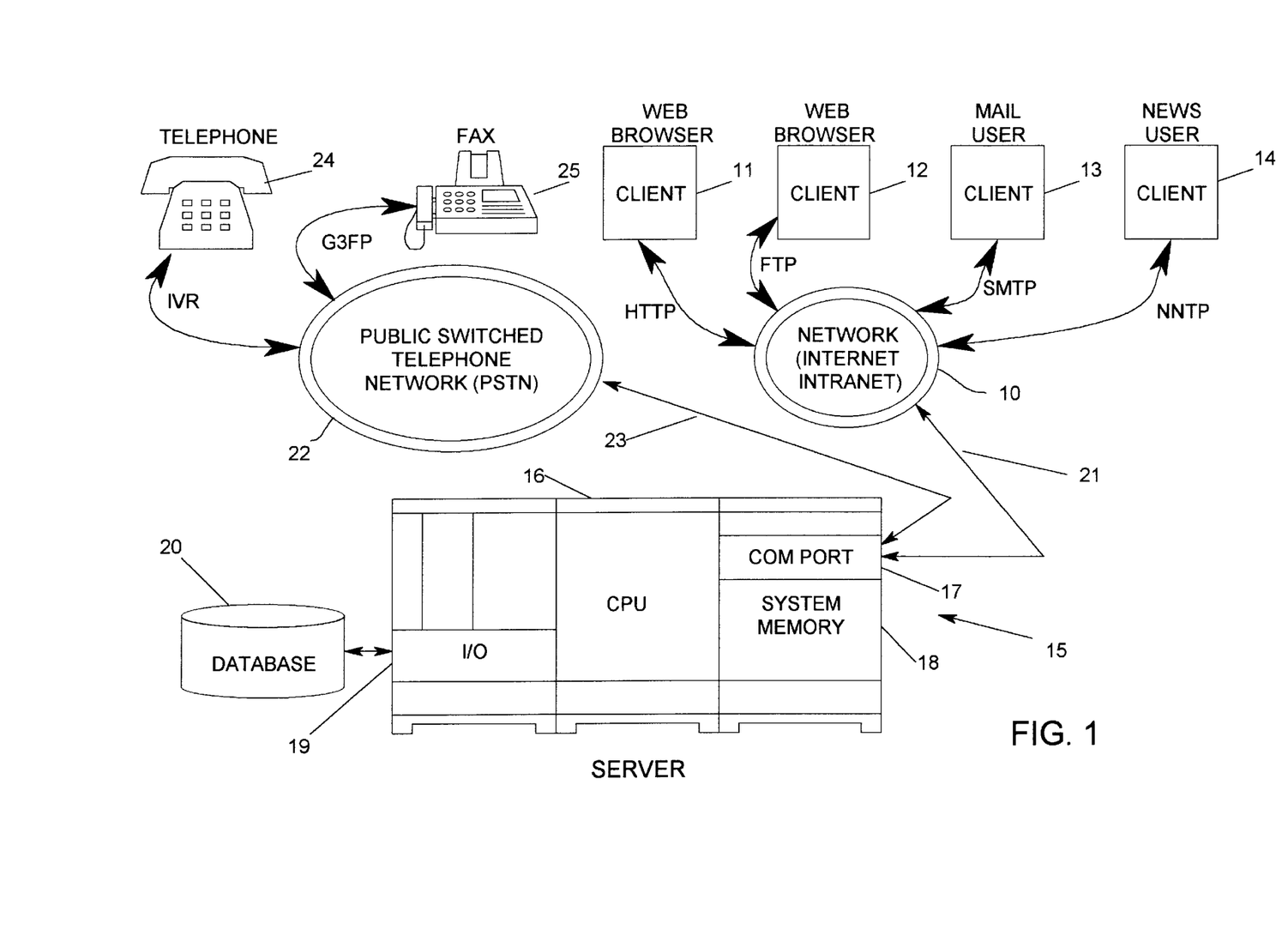
FIG. 1 is a generalized block diagram showing network system connections to clients and the server, including details of the server that executes the method of the present invention.

Referring now to FIG. 1, an overall block diagram of a network system that may employ the method of the present invention is illustrated. A flexible multi-user network system 10, which for purposes of this disclosure represents the Internet (or perhaps an Intranet) is shown coupled between clients 11 through 14 on one side of the network system and a server 15 on the other side. By way of illustration, the client 11 is shown coupled to the network 10 by way of a protocol referred to as HTTP (Hyper Text Transport Protocol). This is a client-server protocol used for information sharing on the Internet and is the basis of use for the World Wide Web (WWW). Client 12 is shown coupled to the network 10 by way of a File Transfer Protocol (FTP). This is a set of Transmission Control Protocol over Internet Protocol (TCP/IP) commands used to log onto a network, to list directories and to copy files.

Client 13 is shown coupled to the network 10 by way of the SMTP protocol, which denotes Simple Mail Transfer Protocol. This is a messaging protocol used by software applications to send and receive e-mail. The client 14, labeled News User, is shown coupled to the network 10 by way of a Network News Transfer Protocol ("NNTP"). The NNTP is a protocol used for distribution, inquiry, retrieval and posting of News articles over the Internet.

The server 15 includes a CPU 16, a communication port 17, a system memory 18, and an I/O channel 19. A storage media suitable for storing a large database, such as a disk drive system 20, is coupled to the server 15 by means of an I/O channel 19. The server 15 is coupled to the network 10 by means of a cable 21 connected to the communication port 17. In a similar manner, a Public Switched Telephone Network 22 (PSTN) is coupled to a telephone 24 using an Interactive Voice Response protocol (IVR). This involves the generation of voice output by a computer. It provides pre-recorded information either with or without selection by the caller. Interactive Voice Response (IVR) also allows interactive manipulation of a database.

The facsimile or FAX machine 24 is coupled to the PSTN 22 by way of a special protocol such as the Group 3 Facsimile Protocol ("G3FP"), which is widely used for facsimile transmissions.

The server 15 operates as a computer in a network shared by multiple users. It can act as a file server whereby it uses a high-speed computer to store the programs and files that are shared by the various users on the network 10. Sometimes this is called a "network server", since it acts like a remote disk drive. The server 15 can also act as a database server in that it is dedicated to database storage and retrieval.

Among the problems characteristic of earlier networks was the lack of continuity of service. Thus, in many cases the user had to perform additional operations in order to make use of voice and FAX transmissions. The method of the present invention eliminates any such need for delay complications in order to handle telephone and FAX transmission. Further, the present invention provides a means for communication between multi-users, together with a simpler and more expanded method for sending data to different types of appliances operating under different protocols. This is handled by the server 15, which provides specialized techniques, as will be discussed hereinafter.

Figure 2:
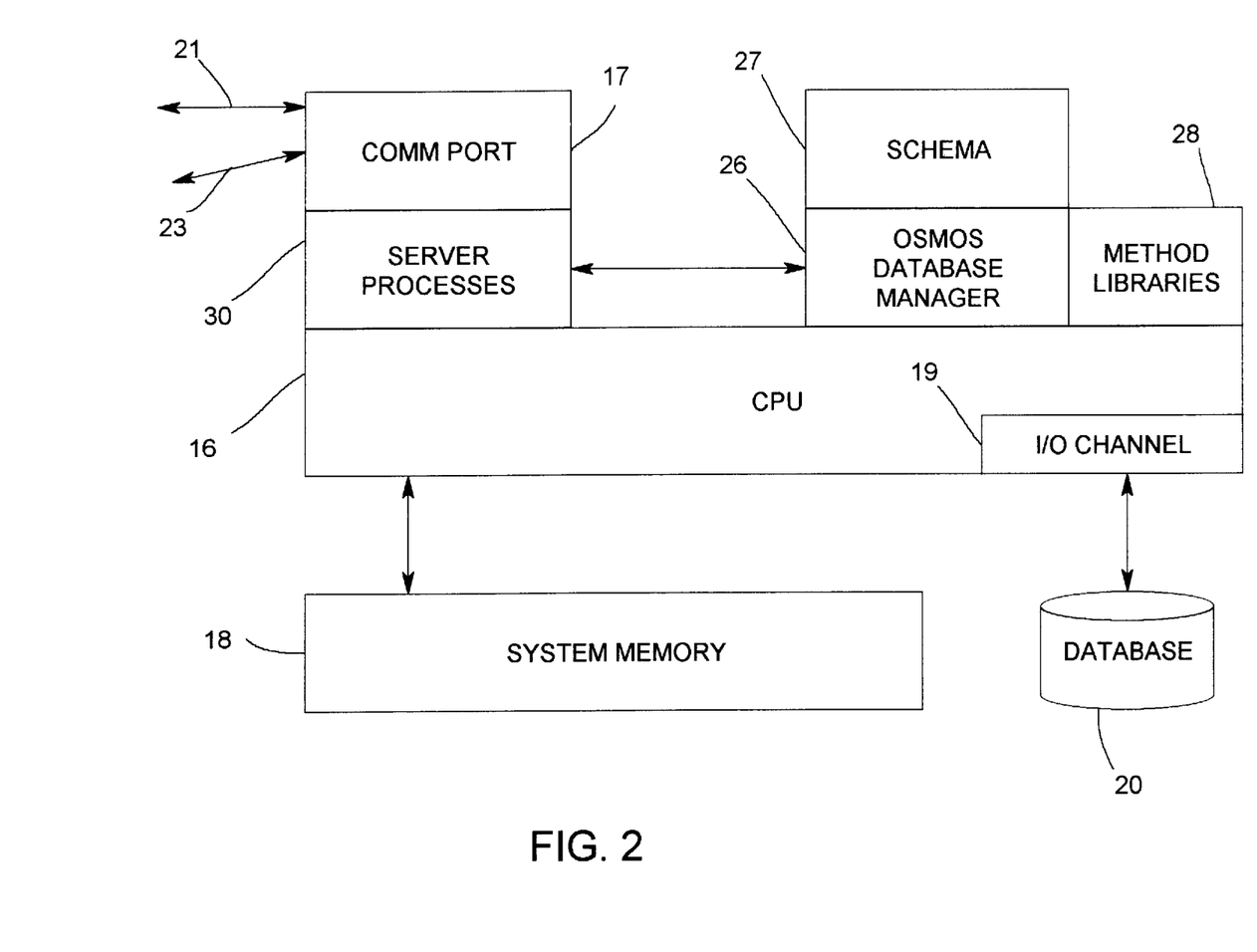
FIG. 2 is a block diagram showing the server (including software modules stored therein for implementing the method of the present invention), and a database storage mechanism coupled to the server.

Referring now to FIG. 2, a block diagram shows typical components of the server 15 and the software modules stored therein for implementing the method of the present invention, with the database 20 coupled to the server by means of the I/O channel 19. The server 15 includes the following software modules: a database manager 26, which is controlled by a schema 27 and a method libraries 28; and, a set of server processes 30 that service the various protocols on the network system 10. Each of these software modules will normally be loaded into the memory 18 from disk storage, or portions will remain on disk until required. Data is transferred from the network 10 or the PSTN 22 via the cable 21 or 23, respectively, through the communication port 17 and server process software 30 to the OSMOS database manager 26, and from there to the database 20 via the I/O channel 19. The CPU 16 executes instructions from the software modules using data from the communication port 17 or the database 20 for storing or retrieving the virtual files in accordance with the method of the present invention as described in greater detail hereinbelow.

The database 20 provides an electronically stored collection of objects, such as document components (text, inter-document links, access rules), IVR components (call flows, voice prompts), multimedia components (audio, graphics, video) and message components (folders, news-groups, articles, e-mail messages). The database 20 is managed by the database manager 26, which comprises software that allows a user to manage multiple data files. In the present embodiment, the manager 26 is an object-relational database management system referred to herein sometimes as OSMOS, which is a software product available from the assignee hereof. OSMOS uses an object-relational model to provide its services and interfaces. Object-relational database systems combine the advantages of compatibility with the standard relational database model with the productivity advantages of object technology. It is noted, however, that other object databases will work satisfactorily with the present invention.

The OSMOS database manager 26 software enables database management capability for traditional programming languages, such as COBOL, BASIC, C and C++, and enables the storage and retrieval of data from the database 20 as will be described further hereinafter. The operational functioning of the OSMOS database manager 26 is handled by a schema 27 and a set of method libraries 28. More particularly, as will be amplified further hereinbelow the schema 27 mimics a file system so as to create a Virtual File system that employs the categorization established by the MIME standard. The term Virtual File as used herein refers to the fact that files stored in the database 20 are an image of real files stored in one of the clients 11–14 coupled to the network system 10. Virtual Files are stored in the database as one or more objects with the attributes (creation date, security, etc.) and contents (a stream of bytes) supported by operations within the database, which allows them to be manipulated in a variety of ways.

There are several advantages of the Virtual File abstraction. For example, as a series of database objects, a Virtual File can possess additional information that a system-level file cannot. That is, the database can record more detailed information on the file's type, enforce greater security control and automatically manage versions. As an abstract object, a Virtual File's content can be represented in a large number of ways. Content can be stored as a stream of bytes, just like that for normal files; modeled as a network of semantic objects; synthesized on the fly from dynamic parameters, and so forth. As a database object a Virtual File can possess encapsulated behavior which is used to process the file (update it, retrieve it, display it, delete it, etc.). As a resident on the database 20, a Virtual File can be backed-up, recovered and otherwise administered with content objects using a common set of tools and procedures. Although Virtual Files are stored as abstract objects, their basis on the well-known file paradigm allows them to be easily accessible via fileoriented protocols, such as FTP and HTTP, etc.

It is noted that a specific protocol is used as a means for accessing the server 15; and, theoretically any format can be transmitted by use of any protocol. The server process software 30 performs the function of servicing the various protocols received by, or transmitted from, the server. This technique is well known in the art and will not be amplified further.

Figure 3:
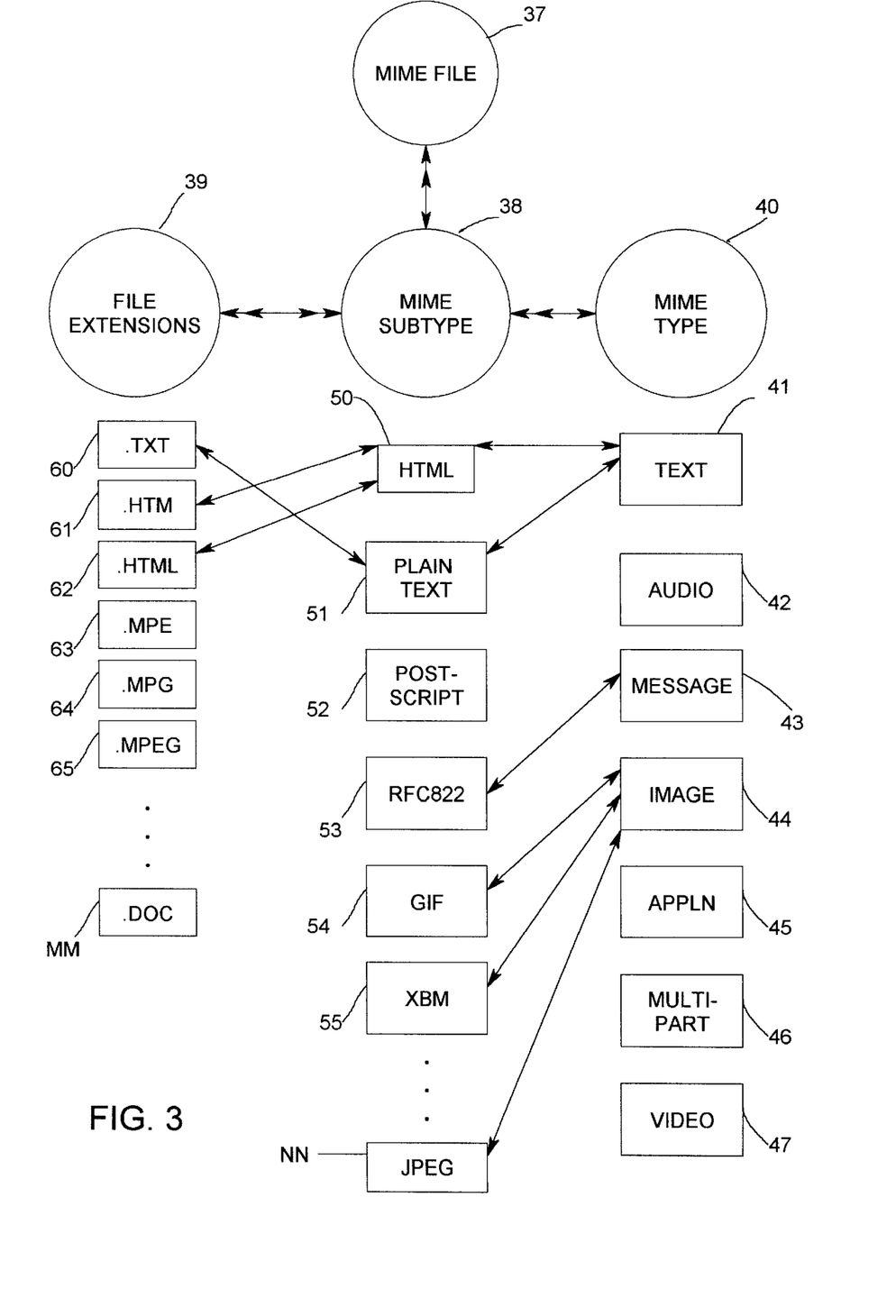
FIG. 3 is a diagram of a look-up table used in determining the type and content of incoming files.

Referring now to FIG. 3, an illustration of a look-up table for deciphering files that are to be loaded into the database in accordance with the MIME standard is shown. Each file received by the server is accompanied by a designation of the MIME type of its content, which describes the data contained in the body of the file. This description of the data is sufficient enough for the receiver to process or store the data in an appropriate manner. The table of FIG. 3 represents the result of an initialization process of the database 20 in accordance with the present invention. That is, the disk is pre-populated with objects for the MIME types and subtypes, as well as for file extensions, with known standards (both de-facto and dejure). It is noted that the terms type and class are used interchangeably to mean the same thing, and in a like manner the corresponding terms subtype and subclass are used interchangeably.

In general, a MIME file 37 points to a MIME subtype 38, and MIME subtype is linked to one or more file extensions 39. Also, the MIME subtype is linked to a MIME type 40. A convention used in the drawings is a double headed arrow for denoting the pointing to a multiplicity of objects. It is noted that every object stored in the database 20 that has content will include an identification of its particular MIME subtype.

The MIME standard defines seven MIME types and at least twenty-one MIME-subtypes. As shown in FIG. 3, the seven content types are illustrated in the right-hand column by blocks 41–47. A portion of the content subtypes are illustrated in the center column by blocks 50–NN. The file name also includes a file extension, which is set off by a period (.) and a partial listing thereof is illustrated in the left-hand column by blocks 60–MM.

The block 41 represents Text, which covers a stream of "printable" characters, usually in the ASCII format. A primary subtype is Plain Text, which is represented by block 51, and is shown linked to the Text block 41. That is, in the vernacular of Object Technology, the Plain Text 51 subtype has a relationship with the Text type 41. The block 42 represents Audio covering audio data, which requires an audio device to "display" the contents thereof. The block 43 represents a Message category, which covers an encapsulated message. The primary subtype for Message is RFC 822 (block 53), which is a Request For Comment defining the Internet standard format for electronic mail message headers.

The block 44 represents an Image category, which covers image data. Image data requires a display device (such as a graphical display, a printer, or a FAX machine) to view the information. The subtypes for this type are GIF (block 54), an XBM category (block 55) and a JPEG category (block NN). The GIF category covers graphics stored in the GIF format. The XBM category covers an X BitMap format, which is a common format used for storing graphical information. The JPEG category is a common format for storing compressed graphical files. The block 45 represents an Application category, which covers some other type of data, typically either uninterrupted binary data or information to be processed by a mail-based application. A primary subtype, "octet-stream", is to be used in the case of uninterrupted binary data.

The block 46 represents the Multi-Part category, which covers data consisting of multiple parts of independent data types. Four initial subtypes are defined for this type: Mixed is a general category for a set of diverse parts, Alternative for representing the same data in multiple formats, Parallel for parts to be viewed simultaneously and Digest for multipart entities in which each part is of the "message" type. The block 47 represents the Video category, which covers video data. Video requires the capability to display moving images and a subtype is MPEG, which is a video file stored in the MPEG format.

File extensions, such as blocks 60–MM shown in the left-hand column of FIG. 3, comprise that portion of a filename following the final point which indicates the kind of data stored in the file, or serves to extend or clarify the file's meaning. Block 60 for example represents the filename extension for text, i.e., "_.txt". In a similar manner, block MM represents the filename extension for a document, i.e., "_.doc". Each of the file extensions 60–MM are linked to a MIME subtype (center column).

Figure 4A:
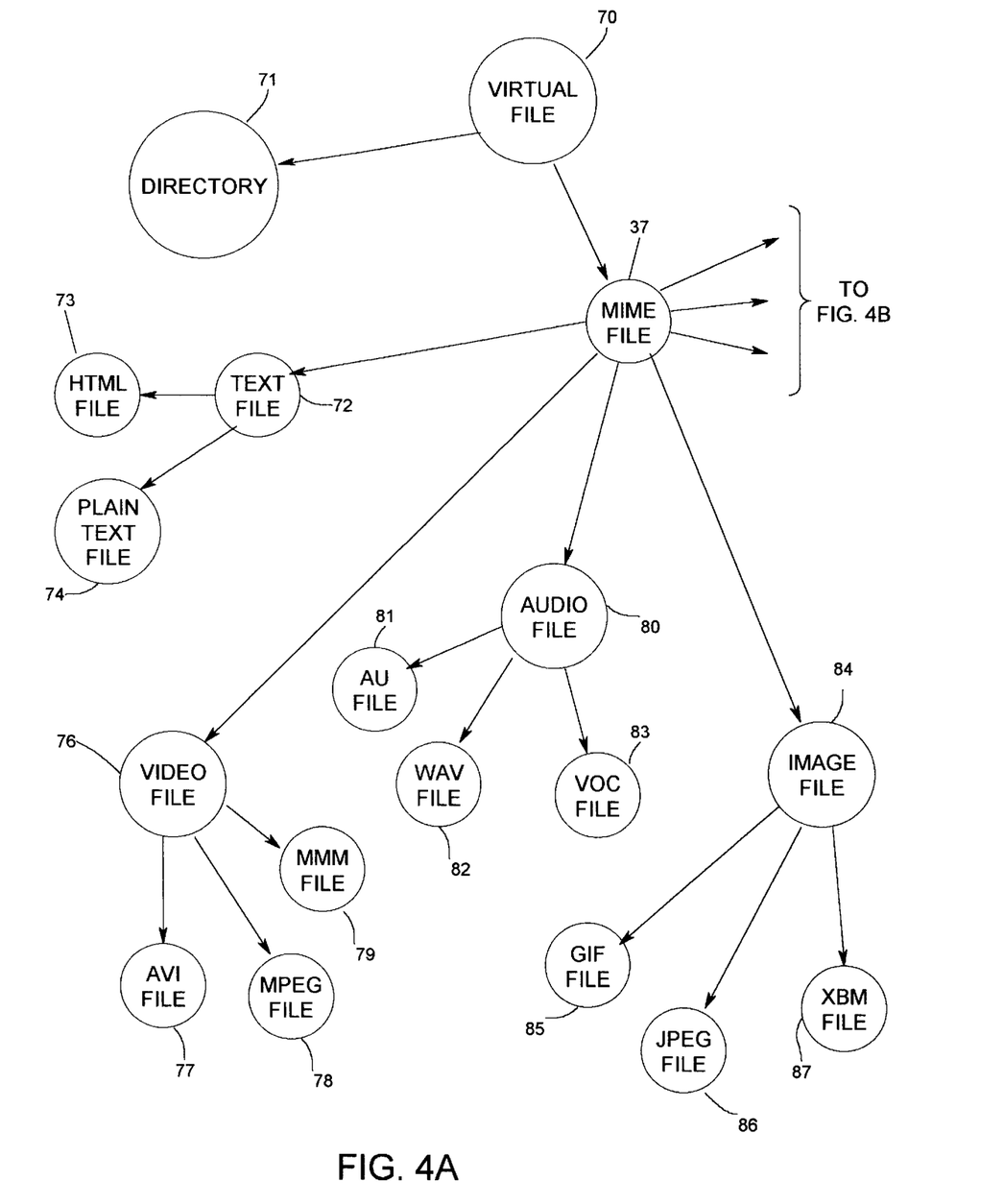
FIGS. 4A and 4B combined form a taxonomy diagram illustrating the complete set of file types and subtypes for establishing a hierarchy of the various files that are to be stored in the database.
Figure 4B:
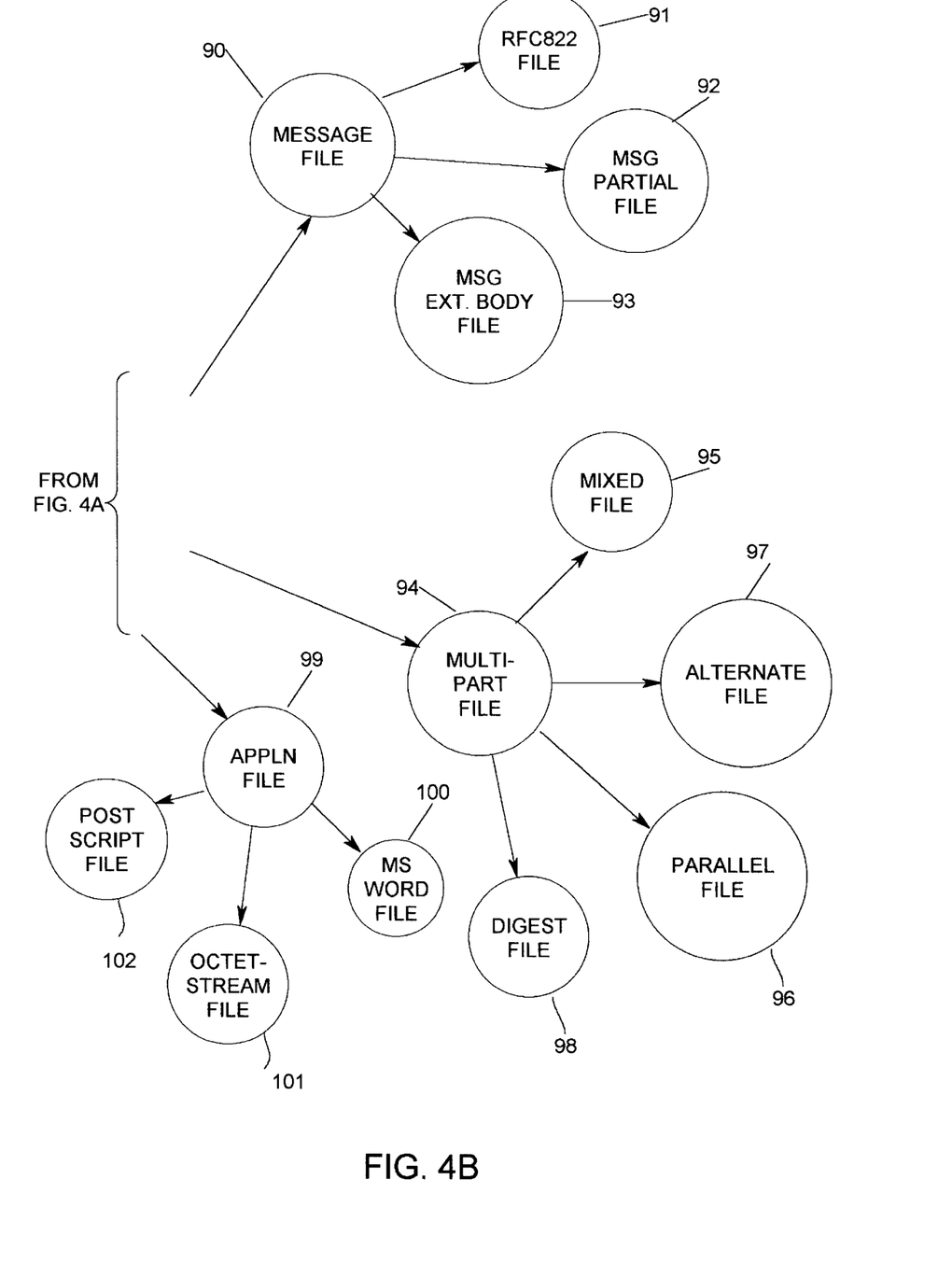

FIGS. 4A and 4B combined form a taxonomy diagram that illustrates the complete set of file types and subtypes for establishing a generalized hierarchy of Virtual Files 70 that are stored as objects in the database 20. That is, the taxonomy diagram illustrates an object hierarchy of data that sub-divides a generic Virtual File class into purposed-based subclasses. For every file stored in the database 20 there is an object in the virtual file hierarchy. Each subclass inherits the generic state and behavior of its superclasses, overrides behavior where a more specific method is required, and adds any additional state and behavior required by the subclass. The Virtual File 70 has a subclass, i.e. a directory 71, which is a conventional means of organizing files containing related information.

In FIG. 4A beginning with the Virtual File 70, a subclass is established with the MIME file 37 as described hereinabove. A bubble 72 represents a Text File, which holds instances of the Text category 41. The subtypes of the Text File 72 are an HTML File 73, which holds instances of the HTML category 50; and, a Plain Text File 74, which holds instances of the Plain Text category 51. A Video File 76, which holds instances of the video category 47, includes three subtypes: an AVI File 77, which is a format defined by Microsoft, Inc., for representing combined full-motion video and audio information in a compressed format; an MPEG File 78, which is a Motion Picture Expert Group standard file format for storing combined compressed, audio and full-motion video information; and, an MMM File 79, which is a Multi-Media Movie file format used for storing combined audio and full-motion video information.

An Audio File 80, which holds instances of another MIME type, has three subtypes: an AU File 81, which is a common format for representing audio files; a WAV File 82, which is shorthand for WAVform audio, and is another common format for storing audio information; and, VOC File 83, which is yet another format for storing audio information. An Image File 84, which holds instances of yet another MIME type, has three subtypes: a GIF File 85, which is a popular graphical file format defined by CompuServe, Inc., for compressed on-line storage; a JPEG File 86, which is a common file format for storing compressed graphical files; and, an XBM File 87, which is a common file format for storing graphical information.

With reference to the files set forth in FIG. 4B, which is an extension of FIG. 4A, a Message File 90 is illustrated with three subtypes: an RFC822 File 91, which was described above as defining the Internet standard format for electronic mail messages; a Message Partial File 92, which is defined in order to allow large objects to be delivered as several separate pieces of mail and automatically reassembled by the receiving party; and, a Message External-Body File 93, which indicates that the actual body data are not included, but merely referenced. In this case the parameters describe a mechanism for accessing the external data.

A Multi-Part File 94 is illustrated with four subtypes: a Mixed File 95, which is intended for use when the body parts are independent and need to be bundled in a particular order; an Alternate File 96, which is syntactically identical to the Multi-Part Mixed File 95 but the semantics are different (i.e., each of the parts is an "alternative" version of the same information); a Parallel File 97, which is also syntactically identical to the mixed file but the semantics are different (i.e., a common presentation of this subtype is to display all of the parts simultaneously—e.g., a Power Point presentation with an accompanying audio description, or video with accompanying audio); and, a Digest File 98, which is also syntactically identical with the mixed subtype but with different semantics (i.e., the default Content-Type value for a body part is changed from "text/plain" to "message/RFC822").

An Application File 99 is used for data which do not fit in any of the other categories, and particularly for data to be processed by mail-based uses of application programs. This File is shown with three subtypes: an MS Word File 100, which is a proprietary application format and is used to process Microsoft Word files; an Octet-Stream File 101, which is a miscellaneous category; and, a Post Script File 102, which is a standard format for describing printed output.

Figure 5A:
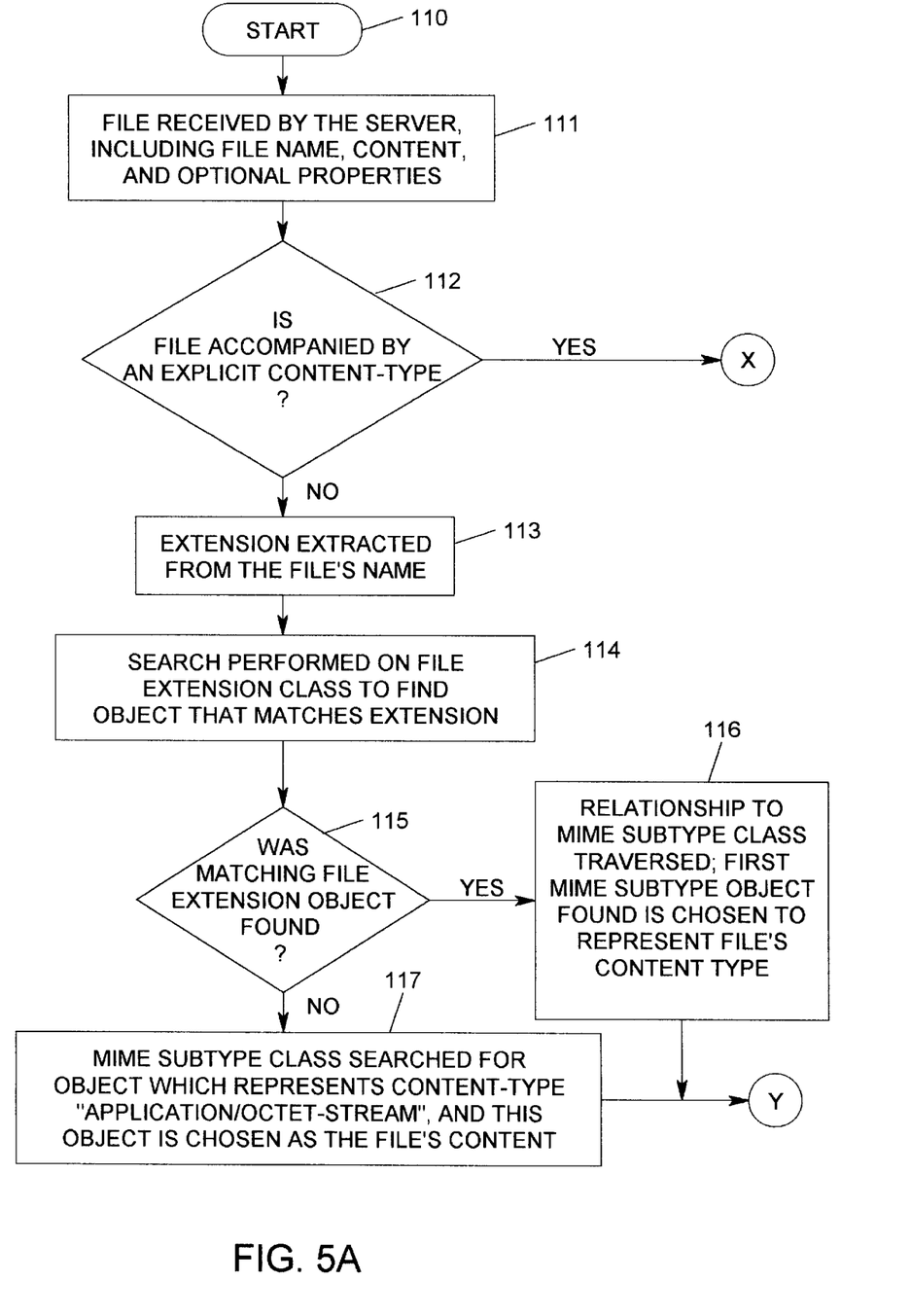
FIGS. 5A and 5B combined form a flow chart illustrating the process for storing a file in the database as a virtual file.
Figure 5B:
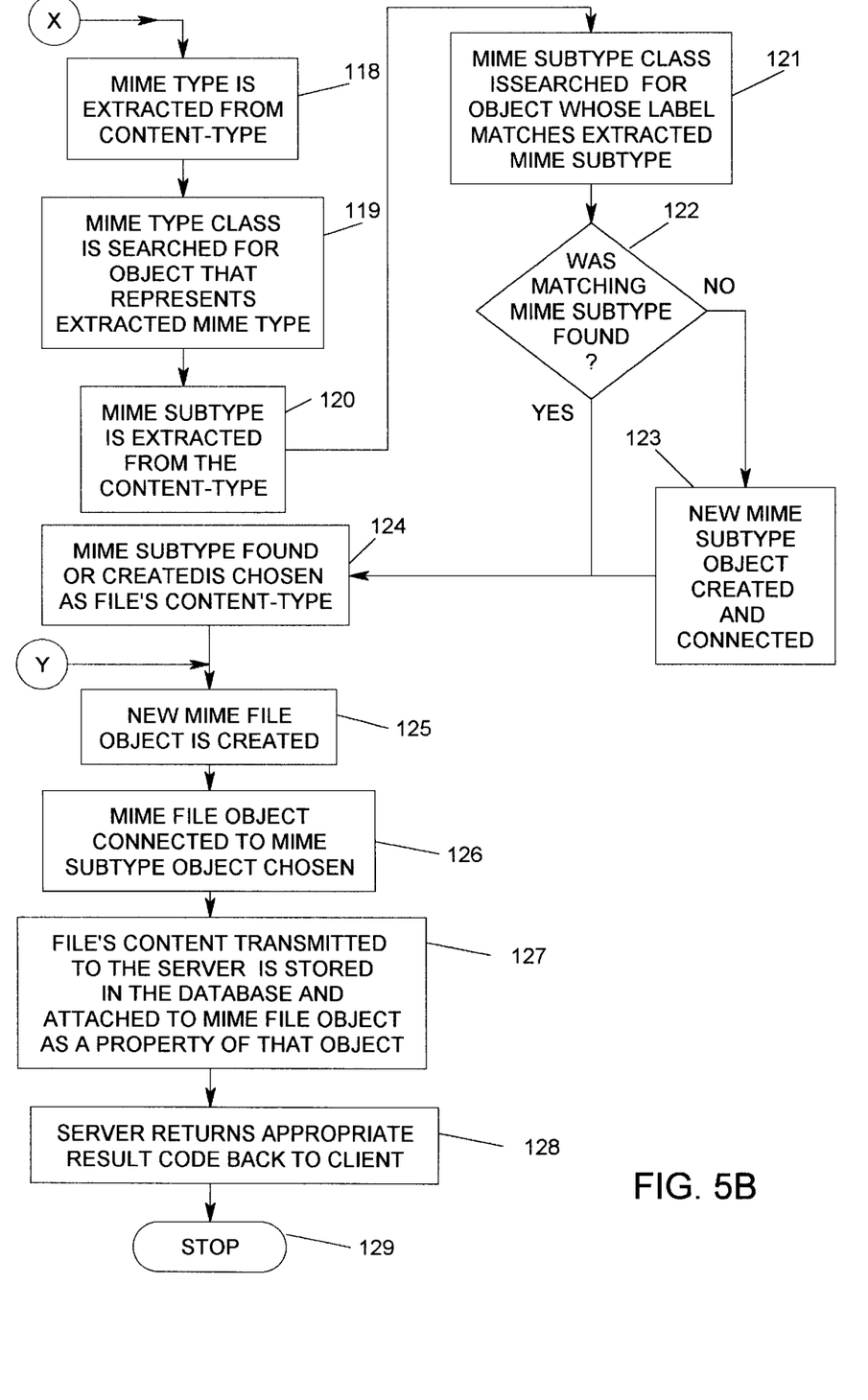

Referring now to the flow chart shown in FIGS. 5A and 5B, the process for storing a virtual file in the database is shown. Assume for purposes of the discussion hereinbelow that one of the clients 11–14 connects to the server 15 using either a standard protocol (e.g., FTP or HTTP), or even a proprietary protocol designed for access to the server. The client then transmits a file to the server via this protocol. Minimally, the file's name and content are provided. If allowed by the protocol used, additional properties of the file may also be transmitted (e.g., an explicit content type). At this juncture of the description reference is made to FIG. 5A, wherein the process of storing a virtual file begins as depicted by a start bubble 110. The server 15 receives the file's name, content and optional properties (block 111).

Next, an inquiry is made as to whether or not the file is accompanied by an explicit content-type (diamond 112). If the file is not accompanied by an explicit content-type, then an extension is extracted from the file's name (block 113). For example, if the file is called "document.txt" then its extension is "txt". Following this, a search is performed on the File Extension class (bubble 38, FIG. 3) to find an object that matches the extension (block 114). For example, a File Extension object is sought whose label is "txt". Another inquiry is made to determine if a matching File Extension object is found (diamond 115), and if so its relationship to the MIME Subtype class (bubble 38, FIG. 3) is traversed, and the first MIME Subtype object found via this relationship is chosen to represent the file's content-type (block 116). Note that because every MIME Subtype object is connected to exactly one MIME Type object (bubble 40, FIG. 3), each MIME Subtype object actually represents an entire content-type. For example, the MIME Subtype object "plain" is connected to the MIME Type object "text" and hence represents the content-type "text/plain".

On the other hand, if no matching File Extension object is found in the step depicted by the block 114, the MIME Subtype class is searched for the object that represents the content-type "application/octet-stream", and this object is chosen as the file's content type (block 117). The illustration of the process continues in FIG. 5B as depicted by a connector Y.

Returning to the description associated with the diamond 112 momentarily, if the File received by the server 15 is accompanied by an explicit content-type, then a branch is taken to the continuation of the process illustrated in FIG. 5B as denoted by a connector X. The MIME type is extracted from the content-type (block 118). For example, in the content-type "application/postscript" application is the MIME type. Next, the MIME Type class (bubble 40, FIG. 3) is searched for an object that represents the extracted MIME type (block 119). If a matching MIME Type object cannot be found, a new MIME Type object is created with the extracted MIME type name. The MIME Subtype is extracted from the content-type (block 120). For example, in the content-type "application/postscript", postscript is the MIME Subtype.

Following this, the MIME Subtype class (bubble 38, FIG. 3) is searched for an object whose label matches the extracted MIME Subtype (block 121), and which is connected to the MIME Type object found or created in the step depicted by the block 119. An inquiry is next made as to whether or not a matching MIME subtype was found (diamond 122). If a matching MIME Subtype object cannot be found a new MIME Subtype is created (block 123) with the extracted MIME subtype name, and the new object is connected to the MIME Type object found or created in the step depicted by the block 119. At this stage of the process, the MIME Subtype object found or created in the preceding step is chosen as the file's content-type (block 122).

The next step following those depicted by the blocks 116 and 117 on FIG. 5A (via the connector Y), and block 124 on FIG. 5B is to create a new MIME File object (block 125). The subclass into which the MIME File object is inserted is that which "agrees" with the content-type chosen in the process steps performed thus far. For example, if the file's content-type is "text/plain", the MIME File object is inserted into the Plain Text File class (block 51 in FIG. 3). If the file's content-type is "application/postscript", the MIME File object is inserted into the Postscript File class (bubble 102, FIG. 4B).

After these steps have been performed, the MIME File object is connected to the MIME Subtype object chosen hereinabove (block 126), and this represents its content-type. Next, the file's content that was transmitted to the server 15 is stored in the database and attached to the new MIME File object as a property of that object (block 127). Following this, the server 15 returns an appropriate result code back to the client (block 128). Finally the process is stopped as depicted by a bubble 129.

Figure 6A:
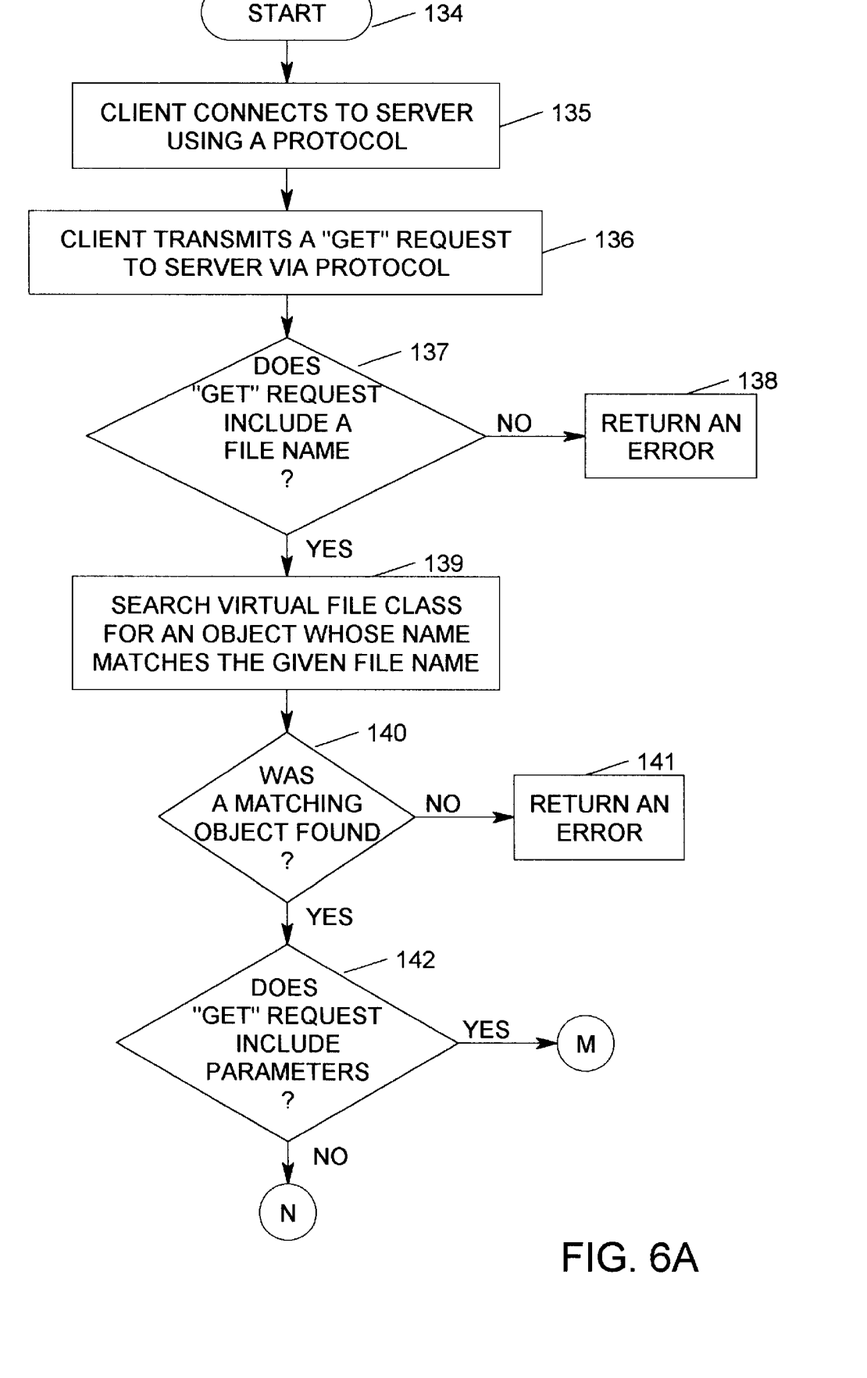
FIGS. 6A, 6B and 6C combined form a flow chart illustrating the process for retrieving a file from the database.

Referring now to FIG. 6A, the first of a three-part flow chart illustrates the process steps for retrieving a Virtual File object from the database, which object has previously been stored therein. The process begins, as denoted by a start bubble 134, followed by a process step (block 135) of a client connecting to the server using either a standard protocol (e.g., FTP or HTTP) or perhaps a proprietary protocol designed for specialized access to the server. Next, the client transmits a "get" request to the server via the protocol (block 136). At a minimum, the get request includes a file name. If allowed by the chosen protocol, the get request may also include parameters which describe additional desirable properties of the file being sought. For example, parameters may be used to define a set of content types and character sets that the client can handle, or a desirable compression technique with which the file should be encoded.

When the "get" request is received by the server 15, an inquiry is made as to whether or not this request includes a file name (diamond 137). If the answer to this inquiry is no, then an error is returned (block 138). On the other hand, if the request includes a file name then a search is made of the Virtual File class for an object whose name matches the given file name (block 139). Another inquiry is made as to whether or not a matching object was found (diamond 140). If the answer is no then an error is returned (block 141). Still another inquiry is made as to whether or not the "get" request includes parameters (diamond 142). If the answer is no, then a branch is taken to a second portion of the instant flow chart as depicted by a connector N.

Figure 6B:
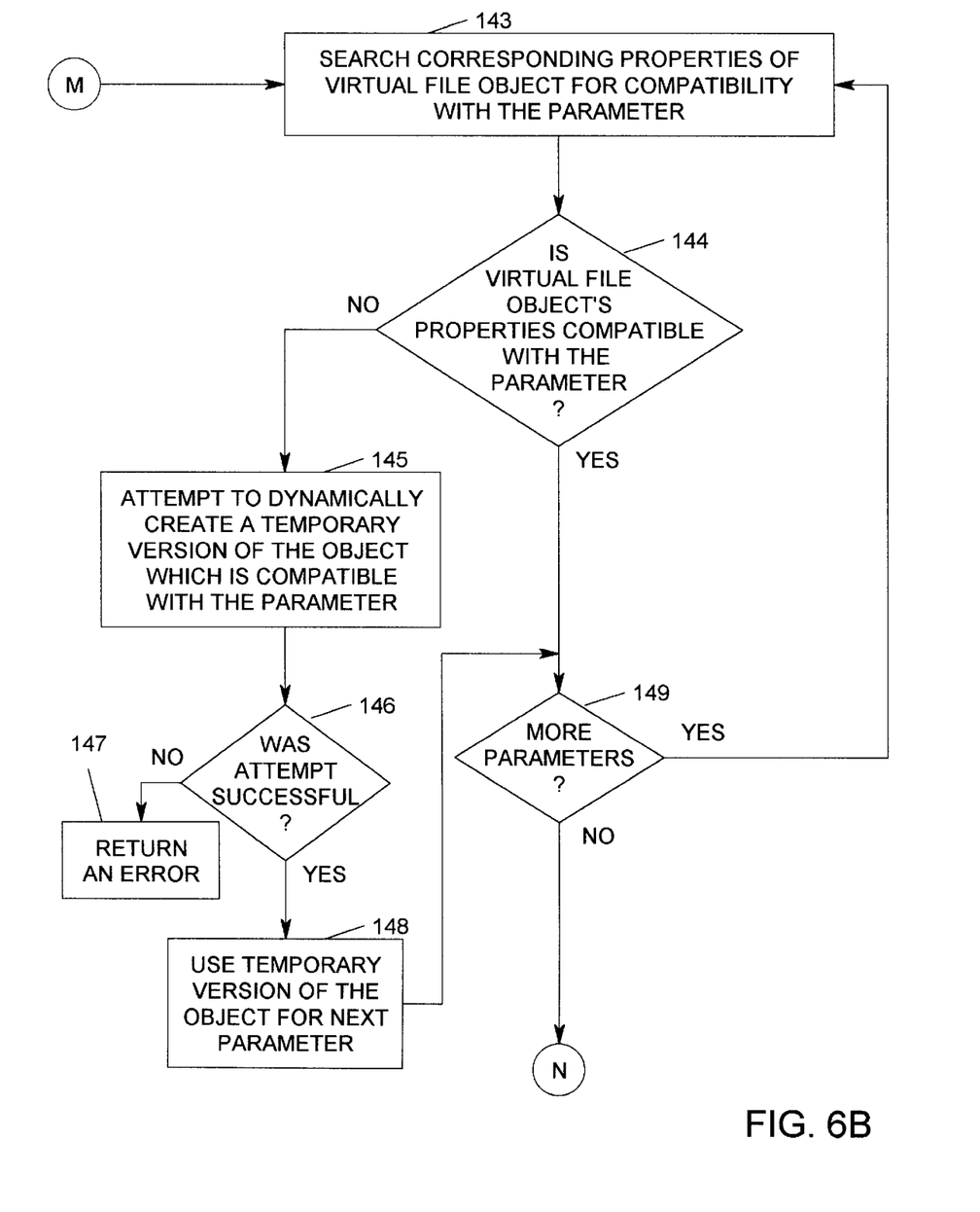

Referring now to FIG. 6B, from the connector M a process step is performed of searching appropriate properties of the Virtual File object for compatibility with the current parameter under examination (block 143). For example, if the parameter represents a list of allowable content-types, the Virtual File object's content-type is examined to see if it belongs within the file list. Next, an inquiry is made as to whether or not the Virtual File object's properties are compatible with the parameter (diamond 144). If the answer is no, then an attempt is made to dynamically create a temporary version of the object that is compatible with the current parameter under examination (block 145).

For example, if the Virtual File object's content-type is incompatible with the parameter, an attempt is made to locate a "converter" object that can be used to dynamically convert the Virtual File object's content to a compatible format. For an in-depth description of object conversion, reference is made to the above-cited co-pending patent application Ser. No. 08/768,387, entitled AUTOMATIC FORMAT CONVERSION SYSTEM AND PUBLISHING METHODOLOGY FOR MULTI-USER NETWORK. Another example of the operation performed by the step depicted by the block 145 is where the Virtual File object's content is not compressed using a desired encoding technique, an attempt is made to temporarily compress the Virtual File object's content with the desired encoding scheme.

Following this, another inquiry is made as to whether or not the attempt was successful (diamond 146). If no, then an error is returned (block 147). On the other hand, if the attempt was successful then the temporary version of the object is used for the next parameter under examination (block 148). After this, yet another inquiry is made as to whether or not there are more parameters (diamond 149). Referring back to the inquiry at diamond 144, if the Virtual File object's properties are compatible with the parameter, then a branch is taken to the same inquiry diamond 149 inquiring if there are more parameters. If the answer to this inquiry is yes, then a branch is taken back to the process block 143 to begin processing of the next parameter. On the other hand, if there are no more parameters then a branch is taken to the third sheet of this flow chart as denoted by a connector N.

Figure 6C:
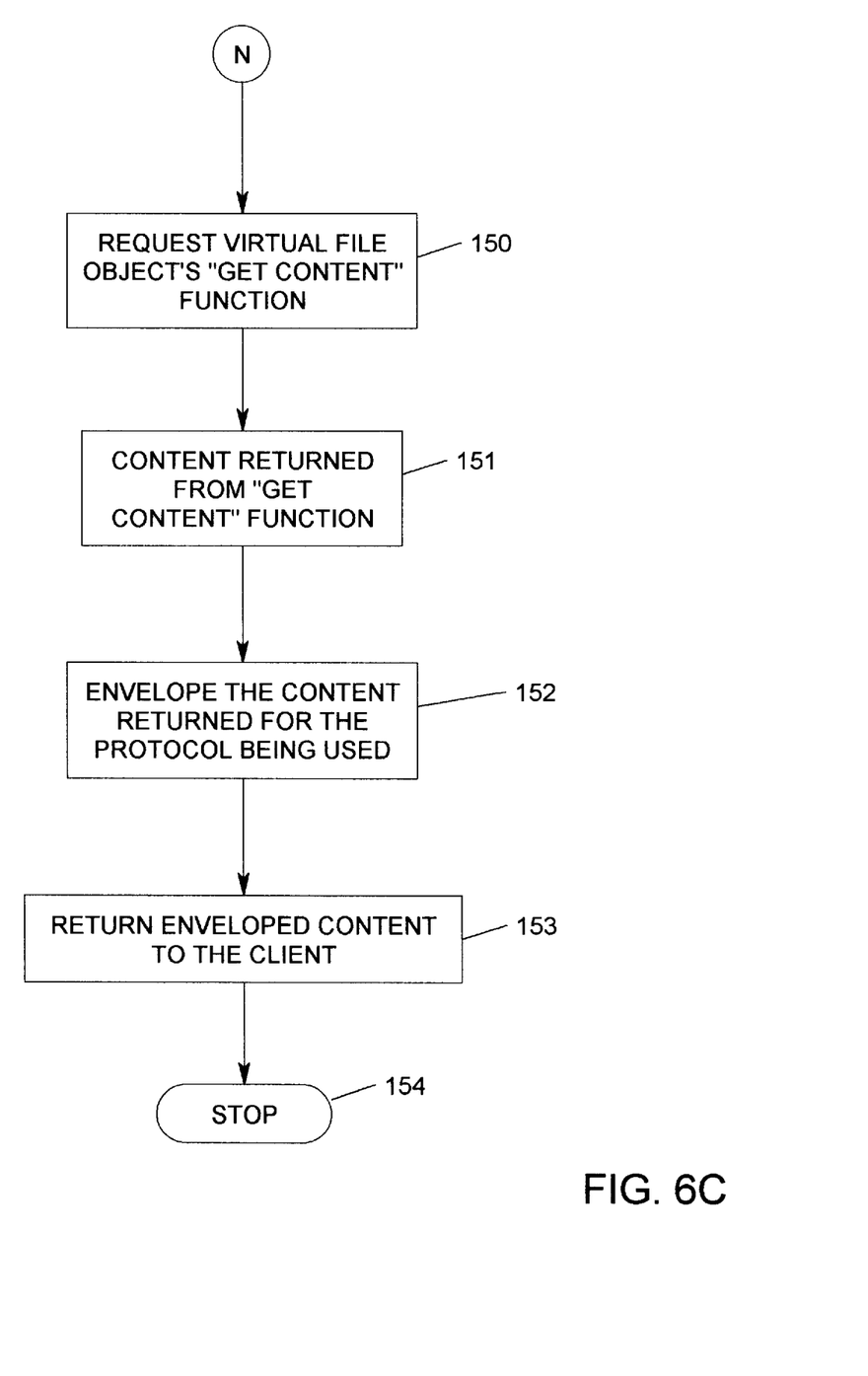

Referring now to FIG. 6C, once all optional parameters are satisfied a request is made upon the Virtual File object's "get content" function (block 150). This function returns the Virtual File object's content in a "stream" fashion, which allows it to be enveloped and transmitted via a large range of protocols (block 151). For a more detailed description of this process reference is made to the above-cited patent application Ser. No. 08/768,386, entitled "SELECTIVE MULTIPLE PROTOCOL TRANSPORT AND DYNAMIC FORMAT CONVERSION IN MULTI-USER NETWORK". By using the "get content" function instead of directly accessing literally-stored content (i.e., as a property of the object), the object can return in a variety of ways: e.g., as literal content, as dynamically converted content, as dynamically generated content (based on other underlying "semantic" objects or get request parameters), and so forth.

Finally, the content is returned from the Virtual File object's "get content" function is enveloped appropriately for the protocol being used (block 152) and returned to the client (block 153). The process is then stopped as depicted by a bubble 154.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a system server for storing files of various formats in an object database coupled to a network including a multiplicity of clients also coupled to said network, said server having a CPU and at least one storage device coupled thereto, said storage device being disposed for storing objects of said database, a method for storing files of various formats received from one or more of said clients in said database, said method comprising the steps of:

a. determining the type and content of files received by said system server from said clients coupled to said network, including:
      i) extracting a file extension from a name of one of said files;
      ii) searching on a file extension class of objects to find an object that matches said file extension extracted in the preceding step;
      iii) if a matching file extension is found, traversing a relationship thereof to a MIME Subtype class; and,
      iv) choosing a first MIME Subtype object found via said relationship to represent the content of said one of said files;
   b. transforming each of said files received by said system server into an object; and,
   c. storing each of said transformed objects into a hierarchy in accordance with the type and content thereof; and,
   d. returning a code back to that one of said clients which transmitted said file to said server indicating receipt of a file.

2. The method as in claim 1 wherein no matching file extension is found further comprising the step of searching MIME Subtype class for an object that represents a content-type "application/octet-stream", which is chosen as content-type for said one of said files.

3. The method as in claim 2 further including the steps of:

a. creating a new MIME File object;
   b. connecting said newly created MIME File object to said MIME Subtype object chosen in the steps of claim 2 hereof, which represents its content-type; and,
   c. storing in said database content-type of said one of said files attached to said newly created MIME File object as a property of that object.

4. The method as in claim 1 further including the step of inserting said newly created MIME File object into a subclass that agrees with the content-type chosen in steps c and d set forth in claim 1 hereof.

5. The method as in claim 1 wherein said one of said files is accompanied by an explicit content-type designation, further including the steps of:
   a. extracting MIME type from content-type of said one of said files;
   b. searching for an object that represents said MIME type extracted in the preceding step;
   c. extracting a MIME subtype for content-type of said one of said files;
   d. searching said MIME Subtype class for an object whose label matches said MIME Subtype extracted in the preceding step and which object is connected to said MIME Type object found in step b hereof;
   e. determining if a matching MIME subtype was found, and if yes;
   f. choosing said object MIME Subtype found in the preceding step hereof as content-type for said one of said files.

6. The method as in claim 5 wherein a matching MIME subtype is not found further including the step of creating a new MIME subtype object with MIME name subtype extracted in step c of claim 6 and connecting to MIME type object found in step b of claim 5.

7. The method as in claim 1 wherein said step of transforming each of said files received into an object further comprises the steps of:
   a. creating a new MIME File object; and,
   b. connecting said newly created MIME File object to said MIME Subtype object chosen in the steps of claim 1 hereof, which represents its content-type; and,
   c. storing in said database content-type of said one of said files attached to said newly created MIME File object as a property of that object.

8. The method as in claim 7 further including the step of inserting said newly created MIME File object into a subclass that agrees with the content-type chosen in steps b and c of claim 7.

9. In a system server for storing files of various formats in an object database coupled to a network including a multiplicity of clients also coupled to said network, said server having a CPU and at least one storage device coupled thereto, said storage device being disposed for storing objects of said database, a method for storing files of various formats received from one or more of said clients in said database, said method comprising the steps of:
   a. determining type and content of files received by said system server from said clients coupled to said network, including:
      i) extracting a file extension from name of one of said files;
      ii) searching on a file extension class of objects to find an object that matches said file extension extracted in the preceding step;
      iii) if a matching file extension is found, traversing relationship thereof to a MIME Subtype class;
      iv) choosing first MIME Subtype object found via said relationship to represent content of said one of said files; and,
      v) if no matching file extension is found, searching MIME Subtype class for an object that represents a content-type "application/octet-stream", which is chosen as content-type for said one of said files;
   b. transforming each of said files received by said system server into an object including:
      i) creating a new MIME File object; and,
      ii) inserting said newly created MIME File object into a subclass that agrees with the content-type chosen in the steps of claim 1 hereof;
      iii) connecting said newly created MIME File object to said MIME Subtype object chosen in step a.v) hereof, which represents its content-type;
   c. storing each of said transformed objects into a hierarchy in accordance with the type and content thereof; and,
   d. returning a code back to that one of said clients which transmitted said file to said server indicating receipt of said file.

10. The method as in claim 9 further including the steps of:
    a. creating a new MIME File object;
    b. connecting said newly created MIME File object to said MIME Subtype object chosen in step a.v) of claim 9 hereof, which represents its content-type; and,
    c. storing in said database content-type of said one of said files attached to said newly created MIME File object as a property of that object.

11. The method as in claim 10 further including the step of inserting said newly created MIME File object into a subclass that agrees with the content-type chosen in steps a and b set forth in claim 10 hereof.

12. The method as in claim 9 wherein one of said files is accompanied by an explicit content-type designation, further including the steps of:
    a. extracting MIME type from content-type of said one of said files;
    b. searching for an object that represents said MIME type extracted in the preceding step;
    c. extracting a MIME subtype for content-type of said one of said files;
    d. searching said MIME Subtype class for an object whose label matches said MIME Subtype extracted in the preceding step and which object is connected to said MIME Type object found in step b hereof;
    e. determining if a matching MIME subtype was found, and if yes;
    f. returning the result of the preceding step hereof as content-type for said one of said files.

13. The method as in claim 12 wherein a matching MIME subtype is not found further including the step of creating a new MIME subtype object with MIME name subtype extracted in step c of claim 12 and connecting to MIME type object found in step e of claim 12.

14. The method as in claim 13 further including the step of inserting said newly created MIME File object into a subclass that agrees with the content-type chosen in claim 13.

15. In a system server for storing files of various formats in an object database coupled to a network including a multiplicity of clients also coupled to said network, said server having a CPU and at least one storage device coupled thereto, said storage device being disposed for storing objects of said database, a method for storing and retrieving files of various formats received from one or more of said clients in said database, said method comprising the steps of:
    a. determining type and content of files received by said system server from said clients coupled to said network, including:

i) extracting a file extension from name of one of said files;

ii) searching on a file extension class of objects to find an object that matches said file extension extracted in the preceding step;

iii) if a matching file extension is found, traversing relationship thereof to a MIME Subtype class; and, iv) choosing first MIME Subtype object found via said relationship to represent content of said one of said files;

b. transforming each of said files received by said system server into an object including:

i) creating a new MIME File object; and, ii) inserting said newly created MIME File object into a subclass that agrees with the content-type chosen in the steps of claim 11 hereof;

iii) connecting said newly created MIME File object to said MIME Subtype object chosen by searching MIME Subtype class for an object that represents a content-type "application/octet-stream", which represents its content-type;

c. storing each of said transformed objects into a hierarchy in accordance with the type and content thereof; and, d. connecting one of said clients to said server using a protocol, and transmitting a "get" request;

e. determining if said "get" request includes a file name, and if so;

f. searching a Virtual File class for an object whose name matches said file name;

g. if a matching object is found, determining if said "get" request includes a parameter, and if so;

h. examining corresponding properties of said matching object for compatibility with said parameter, and if so;

i. examining a next parameter for corresponding properties for compatibility with said next parameter;

j. when all parameters have been examined, requesting said matching object's "get content" function; and, k. returning content obtained in the preceding step to said one of said clients.

16. In a system server for storing files of various formats in an object database coupled to a network including a multiplicity of clients also coupled to said network, said server having a CPU and at least one storage device coupled thereto, said storage device being disposed for storing objects of said database, a method for storing and retrieving files of various formats received from one or more of said clients in said database, said method comprising the steps of:

a. determining type and content of files received by said system server from said clients coupled to said network;

b. transforming each of said files received by said system server into an object; and, c. storing each of said transformed objects into a hierarchy in accordance with the type and content thereof;

d. connecting one of said clients to said server using a protocol, and transmitting a "get" request;

e. determining if said "get" request includes a file name, and if so;

f. searching a Virtual File class for an object whose name matches said file name;

g. if a matching object is found, determining if said "get" request includes a parameter, and if so;

h. examining corresponding properties of said matching object for compatibility with said parameter, and if so;

i. examining a next parameter for corresponding properties for compatibility with said next parameter;

j. when all parameters have been examined, requesting said matching object's "get content" function; and, k. returning content obtained in the preceding step to said one of said clients.

* * * * *